United States Patent
Nagler, Jr. et al.

(10) Patent No.: US 7,147,708 B2
(45) Date of Patent: Dec. 12, 2006

(54) FIBER GEL MIXTURE FOR USE IN CEMENTICIOUS PRODUCTS

(75) Inventors: Richard W. Nagler, Jr., Murrieta, CA (US); Charles Kreulzer, Springfield, IL (US)

(73) Assignee: Solomon Colors, Inc., Springfield, IL (US)

( * ) Notice: Subject to any disclaimer, the term of this patent is extended or adjusted under 35 U.S.C. 154(b) by 0 days.

(21) Appl. No.: 10/975,799

(22) Filed: Oct. 28, 2004

(65) Prior Publication Data

US 2005/0056190 A1    Mar. 17, 2005

Related U.S. Application Data

(63) Continuation-in-part of application No. 10/252,598, filed on Sep. 23, 2002, now abandoned.

(51) Int. Cl.
  C04B 14/38 (2006.01)
  C04B 7/00 (2006.01)
  C04B 16/00 (2006.01)

(52) U.S. Cl. .............. 106/804; 106/711; 106/802; 106/644; 106/642; 106/641; 106/724; 106/731; 106/726; 106/803; 106/805; 106/823; 106/728; 106/810

(58) Field of Classification Search .......... 106/711, 106/802, 644, 642, 641, 724, 731, 726, 803, 106/804, 805, 823, 728, 810
See application file for complete search history.

(56) References Cited

U.S. PATENT DOCUMENTS

| | | | |
|---|---|---|---|
| 5,618,341 A | 4/1997 | Andersen et al. | |
| 5,685,902 A * | 11/1997 | Tezuka et al. | 106/643 |
| 5,690,729 A | 11/1997 | Jones, Jr. | |
| 5,855,665 A | 1/1999 | Johansen, Jr. et al. | |
| 5,951,752 A * | 9/1999 | Johansen, Jr. et al. | 106/712 |
| 6,296,698 B1 | 10/2001 | Naramoto et al. | |
| 6,379,446 B1 | 4/2002 | Andersen et al. | |
| 6,503,625 B1 | 1/2003 | Rieder et al. | |
| 6,569,233 B1 * | 5/2003 | Macklin et al. | 106/644 |
| 6,569,923 B1 * | 5/2003 | Slagter | 524/5 |
| 6,596,210 B1 | 7/2003 | Rieder et al. | |
| 6,790,275 B1 * | 9/2004 | Macklin et al. | 106/644 |
| 2001/0012555 A1 | 8/2001 | Miller et al. | |
| 2001/0023019 A1 | 9/2001 | Rieder et al. | |
| 2001/0045179 A1 | 11/2001 | Crook | |
| 2001/0051266 A1 | 12/2001 | Rieder et al. | |
| 2002/0090871 A1 | 7/2002 | Ritchie et al. | |
| 2002/0166479 A1 | 11/2002 | Jiang | |
| 2002/0170468 A1 | 11/2002 | Luo et al. | |
| 2002/0182408 A1 | 12/2002 | Rieder et al. | |
| 2002/0188042 A1 | 12/2002 | Haile | |
| 2002/0195025 A1 | 12/2002 | Bacher et al. | |
| 2003/0061971 A1 | 4/2003 | Crook et al. | |
| 2003/0109622 A1 | 6/2003 | Malloy et al. | |

OTHER PUBLICATIONS

W.R. Grace & Co. "Grace MicroFiber" product information, from www.graceconstruction.com 2001 (2 pages).
W.R. Grace & Co. "Strux 90/40" product information, from www.graceconstruction.com 2002 (2 pages).

(Continued)

*Primary Examiner*—Elizabeth D. Wood
(74) *Attorney, Agent, or Firm*—Polsinelli Shalton Welte Suelthaus (57) ABSTRACT

The present invention relates to a thickened aqueous solution, or gel solution, for use in providing fiber to a cement composition. Additionally, the present invention relates to a method for adding fibers to cement.

27 Claims, 2 Drawing Sheets

OTHER PUBLICATIONS

W.R. Grace & Co. "ADVA Flow" product information, from www.graceconstruction.com 2002 (2 pages).

W.R. Grace & Co. "ADVA 100" product information, from www.graceconstruction.com 2002 (2 pages).

Watson-Marlow, Inc. "Bredel SP" pumps manual, from www.watson-marlow.com 2002 (13 pages).

Watson-Marlow, Inc. "Bredel SP25" product information, from www.watson-marlow.com/watson-marlow/pop-sp25.htm 2002-2003 (3 pages).

Watson-Marlow, Inc. "Bredel SP32" product information, from www.watson-marlow.com/watson-marlow/pop-sp32.htm 2002-2003 (3 pages).

Pennwalt India Ltd. hose pump, product information, from www.pennwalt.com/hose.html 2000-2001 (2 pages).

seepex Canada Inc. Multi-Hose Axial Flow Peristaltic Pumps (MAP), product information, www.process-controls.com/seepex_produkte15.html 2003 (1 page).

* cited by examiner

FIG.1

FIG.2 ered thereto. The fibers
FIBER GEL MIXTURE FOR USE IN CEMENTICIOUS PRODUCTS

CROSS REFERENCES TO RELATED APPLICATIONS

This application is a continuation in part application of commonly owned U.S. patent application Ser. No. 10/252,598, entitled: FIBER GEL MIXTURE FOR USE IN CEMENTICIOUS PRODUCTS, filed, Sep. 23, 2002, now abandoned and application Ser. No. 10/356,429, entitled FIBER GEL MIXTURE FOR USE IN CEMENTICIOUS PRODUCTS, filed Jan. 31, 2003, now abandoned both applications (Ser. Nos. 10/252,598 and 10/356,429) incorporated by reference herein.

FIELD OF INVENTION

The present invention relates to a gel or thickened aqueous composition containing fibers, with the composition intended for use in cement and similar compositions. The gel mixture serves as a conduit for facilitating the introduction and mixing of the fibers with the cement.

BACKGROUND OF INVENTION

It is known that adding fibers to cement, mortar, concrete, or similar compositions (referred to throughout as cement) will increase the flexular and tensile strength of the cured product. Additionally, the fibers prevent, minimize, or inhibit cracking in the cured cement.

Cement is defined as any mixture of fine-ground lime, alumina, and silica that will set to a hard product by admixture of water which combines chemically with other ingredients to form a hydrate. Mortar is defined as a type of adhesive or bonding agent that may be either inorganic or organic, soft and workable when fresh but sets to a hard, infusible solid on curing, either by hydraulic action or by chemical crosslinking. The chief ingredients of inorganic mortars are cement, lime, silica, sulfur, and sodium or potassium silicate. Concrete is defined as a conglomerate of gravel, pebbles, sand, broken stone, and blast-furnace slag or cinders, termed the aggregate, imbedded in a matrix of either mortar or cement, usually standard Portland cement in the United States.

The addition of fibers to a cement mixture, prior to pouring, will minimize or inhibit cracking in the cured cement product. Minimization and inhibition of cracks is one of the primary reasons for adding fibers to cement. As such, it is well known and desired to add various synthetic fibers or other fibrous materials to cement compositions, as the fibers result in a more desired cured cement product.

Fibers are typically added to cement mixers prior to pouring at a construction site. The fibers are available in bags that are added directly to the mixer, whereby the bags will dissolve in the cement mixture found in the mixer. As such, the bags are added by hand, by workers. Unfortunately, there is no verification concerning whether the proper number of bags were added to the cement mixture. For example, if a bag is dropped on the ground prior to mixing, it is likely that it or a replacement will not be added to the mix. Whether the fibers have been added in the correct amount cannot generally be verified. For this reason, it is desired to have a way to better control and monitor the addition of the fibers.

The method for adding the fibers is not automated, which contributes to the inaccurate addition of the fiber material to the cement material. For this reason, it is desired to have a method that allows for more accurate metering and addition of the fibers to the cement. Typically, a cement truck must be directed to a staging area other than where the cement is added for the bags of fibers to be added thereto. The fibers are added at a location away from where the cement is added. As such, the cement trucks line up and have cement added thereto, with the fibers then added at a different location for safety reasons. This can be time consuming and inefficient. It is desired to have a more efficient method for adding the fibers.

The fibers to be added to the cement typically have a low density and, as such, they tend to float. Conversely, some fibers are of a density such that they sink. Such characteristics make it difficult to readily mix the fibers into a water-based, aqueous solution. Consequently, the fibers are not pre-mixed with water prior to the addition of the fibers to the cement. For this reason, it is desired to have a carrier for use with the fibers, which allows for the suspension of the fibers and easy mixing in the cement. The carrier form should be other than a dry mix to ensure easier addition to the cement. It is especially desired to have fibers available in an aqueous form, whereby the fibers are suspended.

The storage container typically used to hold the fiber gel composition is a gravity-fed bin. Typical gravity-fed bins encounter "bin-hangup" problems, which include rat holing, bridging, arching, adhesion, and/or clogging. These "bin-hangups" limit the output efficiency of the materials fed through the gravity-bins, because of the clumping action by the material within the bin, in the present case the fiber gel composition. For this reason, it is desired to have a storage container configured to minimize "bin-hangups" and facilitate a method for adding the gel fiber composition to the cement.

Thus, it is desired to have a fiber composition which can be more easily added to cement. It is further desired to have a composition that can be easily metered and controlled by an automated process to ensure accurate addition. It is further desired to eliminate manual addition by workers of the fibers to the cement.

SUMMARY OF INVENTION

The present invention relates to an aqueous gel solution, which is a fiber carrier, that can be mixed with cement. In particular, the present invention relates to an aqueous solution containing fibers for use in cement. The present invention further relates to an uncured cement composition containing an amount of cement, fibers, and an aqueous gel composition. The invention further relates to a method for adding fibers to cement.

The aqueous gel solution is of a density and viscosity such that the fibers are suspended, whereby the fibers will not readily sink or float. Also, the gel solution has sufficient flow characteristics to be easily metered into the cement. The gel viscosity will be increased or decreased, dependent upon the density of the particular fiber selected. The aqueous gel solution is formed from water and a thickener, with the amount of thickener varied according to the desired viscosity. Also, different types of thickeners or thickening agents impart different viscosities. As such, the thickener is selected from any of a variety of constituents and mixed with water. Importantly, a gel mixture is formed that will hold fibers for a sufficient period of time in a suspended state so that the fibers will not readily sink or float.

The fibers are added in an amount equal to between 0.1 and 15 lbs. of dry fiber to one gallon of gel. Most synthetic fibers, such as polypropylene, will be added in an amount equal to between 0.5 to 2 lbs. of dry fiber, to one gallon of gel. Heavier fiber materials, such as steel fiber, will be added in an amount equal to between 8 and 12 lbs. of fiber per one gallon of gel. The amount of fiber added to the gel will depend on the desired finished characteristics of the cement, the type of fiber added, and the constituent used to form the gel. The fibers can be selected from any of a variety of constituents, as long as the cured concrete properties are improved. In particular, the fiber material should inhibit cracking. The fibers range in length between 0.0625 inches and 2.5 inches. It is preferred to have a length ranging between 0.25 inches and 0.75 inches. Any length can be used as long as the cement properties are improved, and the fibers are adequately mixed into the cement. The available fibers include polypropylene, polyester, nylon, steel, and combinations thereof. The gel with the fibers is added to the cement in an amount equal to between 1 quart and 20 gallons per cubic yard of cement.

The method includes adding fibers to cement, with the method initiated by forming a gel composition from fibers and a thickened aqueous composition. Next, the method includes adding the gel fiber composition to cement prior to pouring. As such, a method for adding fibers to cement is provided.

The gel fiber composition can be pumped with a peristaltic pump, from a storage container to a container with the cement, such as a cement truck. The storage container construction minimizes "bin hangups" and facilitates unencumbered flow of the gel composition to the pump. The pump is configured to ensure a steady flow of the gel composition. Intermediate the storage container and pump is a length of hose to facilitate transportation of the gel composition from the discharge opening of the storage container to the pump. Additionally, an outflow hose connects to the discharge port of the pump to deliver the gel composition to the cement trucks.

The present invention is advantageous because a method for the controlled and monitored addition of fibers to cement is provided. Additionally, the gel composition is preferred, because it enhances dispersion and addition of the fibers in the cement.

BRIEF DESCRIPTION OF THE DRAWINGS

Attention is now directed to the drawing figures, where like numerals, letters and characters indicate corresponding or like components. In the drawings.

DETAILED DESCRIPTION

The present invention relates to a gel composition, or thickened aqueous composition, containing an amount of a fiber constituent, with the aqueous gel composition containing the fibers for use in cement. The gel composition is a carrier for the fiber constituent. The present invention also relates to a cement composition, which includes the gel composition containing the fibers. Additionally, the present invention relates to a method for adding fibers to cement prior to the pouring and curing of the cement. Thus, the present invention relates to a gel composition containing an amount of a fiber constituent suspended within the gel composition, whereby the gel facilitates the mixing of the fibers with the cement.

The gel composition, also known as the thickened aqueous composition, is formed by mixing an amount of the fiber constituent with an amount of a gel constituent. Any of a variety of fibers may be used in the present invention as the fiber constituent, as long as the fibers are readily suited for use with cement, concrete, mortar, or similar compositions. The fibers are added to inhibit or prevent cracking in the cured cement products, and to preferably increase tensile and flexular strength. As such, the fibers should be of a character, whereby once added to cement, cracking is inhibited or prevented. Preferably, the fiber constituent is selected from the group, which includes polypropylene, polyester, nylon, steel, cotton, wool, iron shavings, rubber, aluminum, and combinations thereof. Any synthetic or natural fiber, which does not readily degrade in the cement and which imparts the desired improvements to the cement, can be used. The fibers will range in length between 0.0625 inches and 2.5 inches; however, other lengths can be used, as long as the fibers readily mix with the cement. More preferably, the fibers will have a length ranging between 0.25 and 0.75 inches. Additionally, the fibers will need to impart the desired characteristics. The fibers generally have a density equal to between 0.5 and 9.0. Any density may be used as long as the fiber material can be suspended. Synthetic fibers generally have a specific gravity ranging between 0.5 and 1.5. Steel fibers generally have a specific gravity ranging between 7.4 and 9.0. Ultimately, the fibers will be added to the cement in an amount equal to between 0.1 lbs. of dry fiber to 15 lbs. of dry fiber per gallon of gel. The gel is then added in an amount ranging between 1 quart and 20 gallons per cubic yard of cement.

The fiber constituent can be suspended in any of a variety of aqueous gel constituent compositions, or similar type aqueous carriers. The gel compositions should have a viscosity such that the selected fibers do not readily float to the top, or settle to the bottom of the solution. Water has a density of about 1 centipoise at 20° C. This is the standard from which the gel will be measured. As such, the gel should have a viscosity greater than 1.0 centipoise. The selected viscosity is dependent upon the selected fiber. The fibers should remain suspended in the solution. Typically, the aqueous solution will have a viscosity sufficient that the fibers will be suspended. Also, the solution should be of a sufficient flowability to ensure addition to cement. It is preferred for the aqueous solution to be water-based, as water mixes well with cement. Most importantly, the solution must be such that it can be readily mixed with cement without any adverse effects. Preferably, the aqueous solution is formed from water and a thickening agent to form a colloid suspension. A gel is defined as a colloid. In a colloid, the disperse phase has combined with the continuous phase to produce a viscous jelly-like product. A colloid solution is a system intermediate between a true solution and a suspension. Compositions suitable for use as thickeners for use in forming the gel include xanthan gum, locust bean gum, guarana gum, tragacahth gum, Arabic gum, cassia tora gum, sodium alginate potassium alginate, ammonium alginate, calcium alginate, alginate ester, carrageen, alpha cellulose, powdered cellulose, microcristilline cellulose, cologel, ethal cellulose, hydroxpropyl cellulose, carboxymetil cellulose, agar-agar, bentonite, cellulosit, attapulgate clay, actigel 150, bentone, gelatin, acacia, acaten, gum Arabic, cellulose dextran, furcellaran, ghatti, guar gum, karaya, konjac, locust bean, pectin, psyllium, tamarine, and tragacanth. It should be noted that the aqueous solution should be one that is readily used under ambient conditions, and can be easily mixed so that heating is generally not required to blend the fibers with the gel. Optionally, a fungicide, such as "surcide p" can be added to the gel to inhibit fungal formation. Preferably, the thickening agent does not require additional ingredients, such as latex or pigments to produce the gel or the final gel fiber composition. The gel fiber mixture can be formed from only the combination of water, the thickening agents listed above, and fibers.

The fiber and gel will be mixed in a ratio of 0.1 to 15 lbs. of dry fiber to about one gallon of gel. The ratio will be dependent on the density of the fiber and the viscosity of the gel. A more preferred range is as follows: 1 lb. of dry fiber to 1 gallon of gel.

The gel composition with the suspended fibers (gel fiber composition) should be flowable with the fibers remaining suspended within the gel solution during delivery. Typically, the gel fiber composition should allow the maximum amount of fibers to pass, suspended in the gel fiber composition, in the fastest time.

Once the gel fiber composition has been formed, it can be added to the cement composition. The gel fiber composition can be added to any of a variety of compositions, including cement, concrete, mortar, and similar compositions. It is preferred to add the gel fiber composition at the station where cement is placed into concrete trucks. Thus, the gel fiber composition is added simultaneously with, or shortly thereafter, the addition of the cement to the cement mixer truck. Advantageously, the gel fiber composition can be added via a metering system at the cement plant, whereby a desired amount of fibers are added without human input or responsibility. As such, the system for adding the fibers can be automated, which will reduce the possibility of human error.

The gel fiber composition will be pumped, typically with a peristaltic/hose pump or a progressive cavity pump from a storage container into a weigh chamber, and then gravity fed into the ready mix truck or water scale. Peristaltic/hose pumps are preferred, as they are metering pumps, and run at a controlled speed. They are typically computer controlled metering pumps. The desired amount of the gel fiber composition pumped into the weigh chamber can be controlled via the peristaltic/hose pump by setting the rate of flow per minute. The desired final output amount of the gel fiber composition can be set and/or controlled by a computer or other timing device.

Other pumps suitable for delivering the gel fiber solution include, a single or double diaphragm pump, provided a wash cycle was used to clean the pump, piston pump, auger-style pump, or lobe pump. Pumping should be at a speed that allows for minimized flow resistance for gels with all sizes of fibers, and also, allows for batching within time restrictions. For example, typical pumping speeds can range from approximately 6 gallons per minute to approximately 12 gallons per minute, with a speed of 11.5 gallons per minute preferred.

The storage container is constructed to avoid "bin hangups" typically encountered with gravity-fed bins. Examples of "bin hangups" include rat holing, bridging, arching, adhesion, and/or clogging. "Bin hangups" are problematic and limit the output efficiency of materials used in gravity-fed bins. Typically, the storage container configuration is a cylindrical shape with at least one opening or mouth for enabling the loading of the gel composition into the storage container, and at least one discharge opening or port for emptying the contents of the storage container. Preferably, the storage containers conical bottom is configured with the bottom surface sloped toward the discharge opening. The slope of the bottom surface can be configured with an angle from 5° to 85° in relationship to the plane of the horizontal (typically represented by the floor), whereby enabling the contents of the storage container to move downward without restriction.

In another embodiment, the storage container is configured in a cylindrical shape with a sloped conical bottom constructed at an angle of 60° in relationship to the plane of the floor and the discharge opening offset from the center. The offset sloped conical bottom construction of the storage container enables material to move downward without restriction, whereby minimizing the tendency for "bin hangups." An exemplary storage container is the 30–100 cu. ft. dispenser commercially available from Ingredient Masters™ of Cincinnati, Ohio.

The storage container is typically positioned with the sidewalls perpendicular to the floor surface. The storage container is plumbed to allow discharge of the gel fiber composition and minimize "bin hangups."

The storage container configuration also facilitates the flow of the gel fiber composition from the storage container through the hose/line to the pump, by exerting a positive head pressure on the fiber gel composition at the discharge opening. The positive head pressure is a constant positive pressure placed on the gel fiber composition to facilitate the flow of the gel fiber composition through the hose/line to the pump. The configuration of the storage container not only minimizes "bin hangups," but also ensures a constant flow of the gel fiber composition to the pump.

A hose/line is configured intermediate the storage container and pump for transporting the gel fiber composition from the storage container to the pump. The hose/line configured intermediate the storage container and pump can be of varying length. Typically, the hose/line is equal to or less than ten feet (10') in length. The hose/line is typically composed of material, which is smooth, without protrusions, burrs, and the like, such as plastic, rubber, fiberglass, and/or combinations thereof, so as not to catch the fibers suspended in the gel fiber composition and cause fiber build up to a point of clogging the hose/line. For this reason, the hose/line typically includes bell reducers or swedges or other cone or funnel shaped reducing structures to minimize potential clogs. Typically, the end of the hose/line with the larger diameter is connected to or placed in the storage container, while the smaller diameter end is connected to the pump.

A second hose/line is typically used to transport the gel fiber composition from the pump to a cement truck, or the weigh chamber, for mixing with the cement composition. The second hose/line is typically composed of material which is smooth, without protrusions, burrs, and the like, such as plastic, rubber, fiberglass, and/or combinations thereof, so as not to catch the fibers suspended in the gel fiber composition and cause fiber build up to a point of clogging the hose/line.

The weigh chamber could be omitted, and the amount of the gel fiber composition added to the cement composition could be verified with a flow meter, or other measuring device. Also, the gel fiber composition could be verified volumetrically. Any device can be used, as long as the device allows for accurate metering and tracking of the amount of gel fiber composition into the cement and is of a design such that the fibers do not get stuck in the device.

Figure 1:
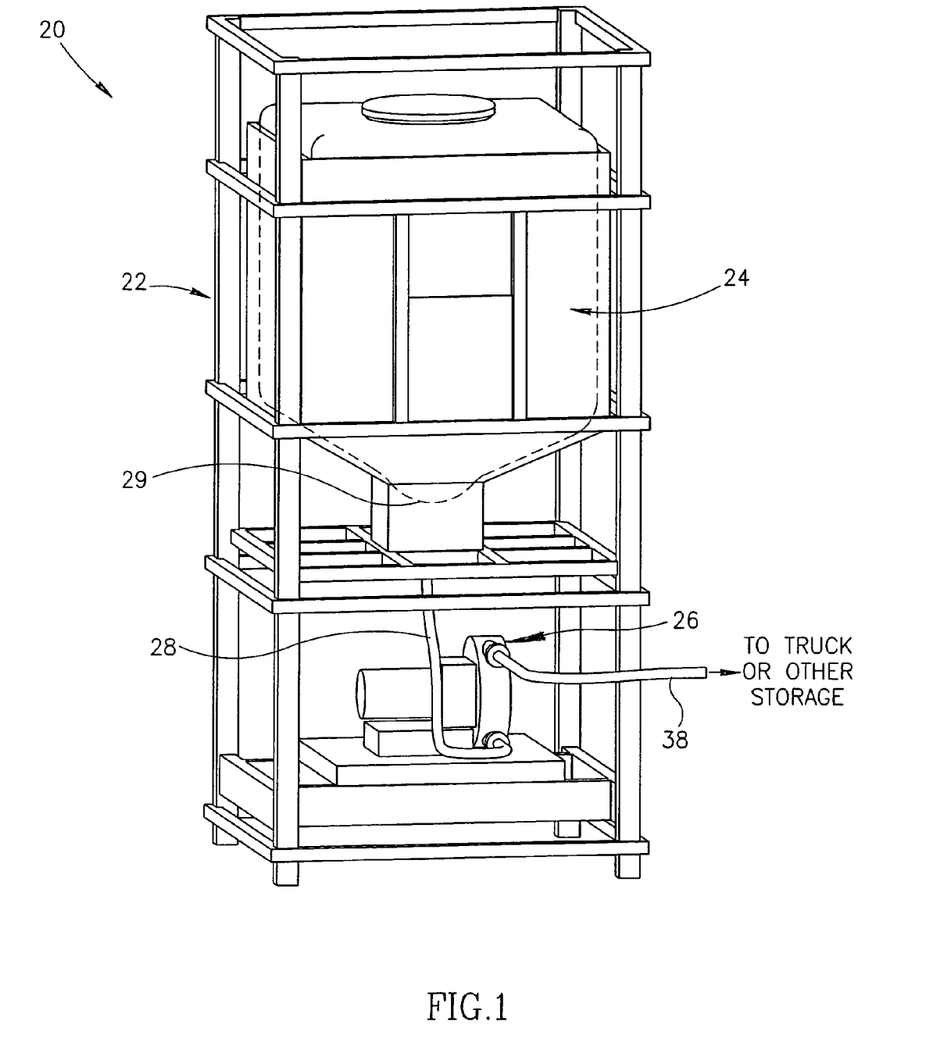
FIG. 1 is a perspective view of an apparatus in accordance with an embodiment of the present invention.
Figure 2:
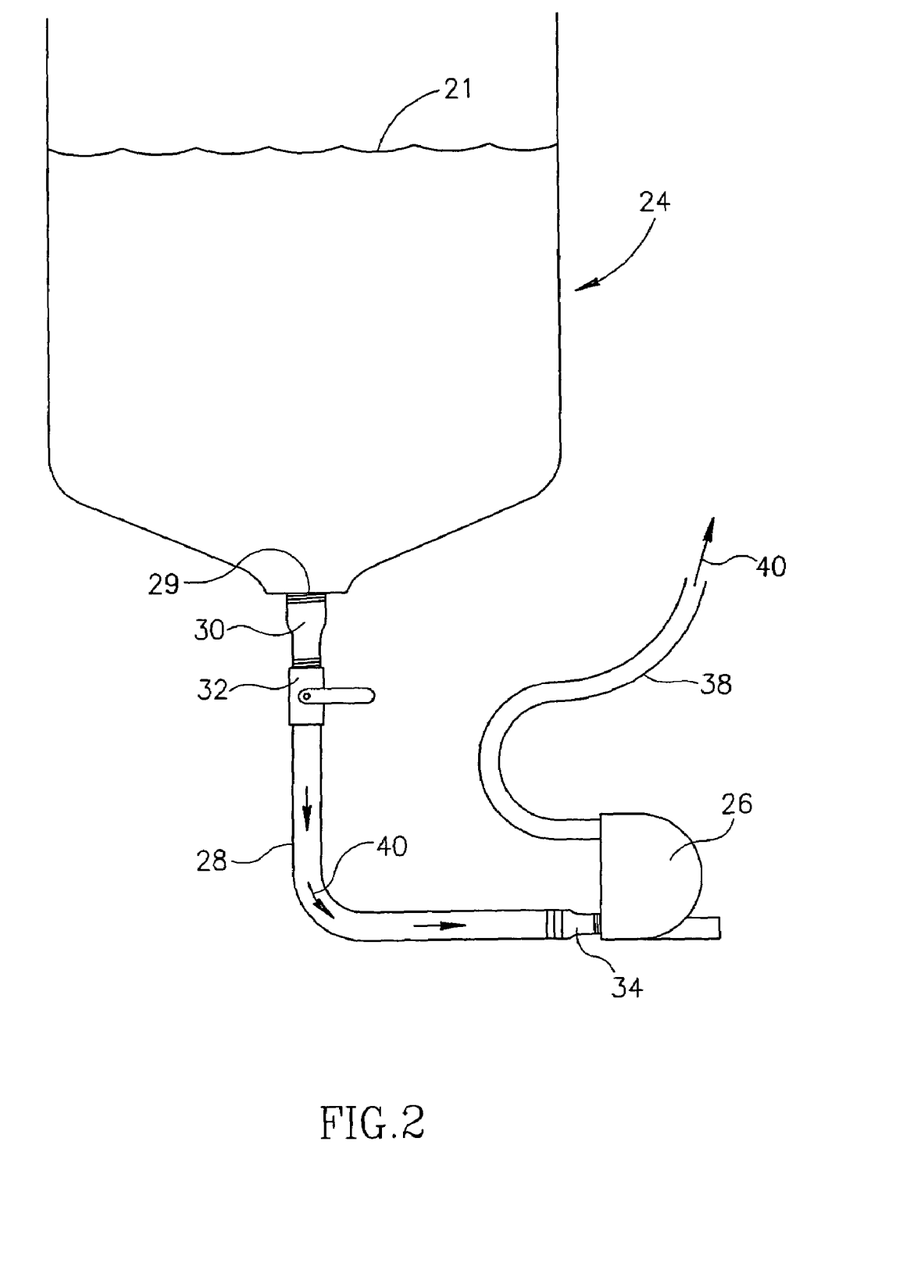
FIG. 2 is a front view of the container and its attachment to the pump of the embodiment of FIG. 1.

For example, FIGS. 1 and 2 show an exemplary apparatus 20 from which the fiber solution 21 is delivered to ready mix trucks or the like. The apparatus 20 includes a stand 22, that supports a storage chamber or tote 24, connected to a pump 26, by a line 28 (an inflow line). The line 28 receives solution 21 from the storage chamber 24 (having an opening 29), through a bell reducer 30 and ball valve 32, typically open and controlled manually.

The bell reducer 30 is typically necessary to provide a smooth movement of the solution between the opening 29 of the storage chamber 24, for example, three inches in diameter, to the ball valve 32 and line 28, for example, two inches in diameter. There may also be a bell reducer 34 between the line 28 and the pump 26. A line 38 connects to the pump 26 and serves as an outflow line, through which solution is delivered to the trucks or the like, as noted in Examples 7–11 below. Solution flow through the apparatus in accordance with the arrows 40.

EXAMPLES

Example 1

A cement mixture was prepared for use in comparing a cured cement product with a cement product having fibers added thereto.

The below list describes the starting materials, equipment, and characteristics:

| Mix ID No. 1 | | | | |
|---|---|---|---|---|
| Description: | 5 Sack Mix | W/C ratio: | | 0.64 |
| Strength (fc): | N/A psi | Sack Content: | | 5.00 sk. |
| Slump: | 4 inch | Gal/sk.: | | 7.20 |
| Max. Size of Agg.: | 1 inch | Un. Wt.: | | 146.3 |

As can be seen, the process started with 5.00 sacks or 470 pounds of cementicious material mixed with 7.2 gallons of water per sack or 36 gallons of water. All procedures outlined in ASTM C31 were used to place the cement in molds. This was a standard mix, regardless of whether fibers were added.

A cement composition was formed. The following list describes the constituents added to the mixture used to form the cement:

| Contents | Batch Wt. | % Used | Sp. Gr. | Volume |
|---|---|---|---|---|
| Cement | 400 | 85 | 3.15 | 2.04 |
| Fly Ash-Class F | 70 | 15 | 2.33 | 0.48 |
| Sand | 1581 | 50 | 2.62 | 9.67 |
| 1" × #4 | 1247 | 39 | 2.65 | 7.54 |
| ⅜" × #8 | 352 | 11 | 2.65 | 2.13 |
| Water | 36.0 gal. 299.9 | | | 4.81 |
| Entrapped Air | 1.25% | | | 0.34 |
| | Wt. = 3950 | | Vol. = | 27.00 |
| ADMIXTURES: | | | | |
| None | | | | |

As can be seen, a mixture of ash, sand, and cement, without additives, was formed. The cement was cured and then tested.

Listed below are the results of tests conducted on the cured cement product:

| Field Test Results | | | | Compressive Strength Results | |
|---|---|---|---|---|---|
| Slump: | 5" | ASTM C143 | 28 day | 107820 | 3814 |
| Concrete Temp: | 79° F. | ASTM C231 | 28 day | 106740 | 3776 |
| Air Temp: | 90° F. | ASTM C138 | 28 day | 107280 | 3795 |
| Time: | 15:05 | ASTM C1064 | avg. | | |
| Time Set: | 20:30 | | | | |

The results show a cement composition having characteristics similar to other known cement compositions.

Example 2

A cement mixture was prepared for use in comparing a cured cement product with a cement product having fibers added thereto.

The below list describes the starting materials, equipment, and characteristics:

| Mix I.D. No. 2 | | | |
|---|---|---|---|
| Description: | 5 Sack Mix | W/C ratio: | 0.64 |
| Strength (fc): | N/A psi | Sack Content: | 5.00 sk. |
| Slump: | 4 inch | Gal/sk.: | 7.20 |
| Max. Size of Agg.: | 1 inch | Un. Wt.: | 146.3 |

As can be seen, the process started with 5.00 sacks or 470 pounds of cementicious material mixed with 7.2 gallons of water per sack or 36 gallons of water. All procedures outlined in ASTM C31 were used to place the cement in molds. This was a standard mix, regardless of whether fibers were added.

A cement composition was formed. The following list describes the constituents added to the mixture used to form the cement:

| Contents | Batch Wt. | % Used | Sp. Gr. | Volume |
|---|---|---|---|---|
| Cement | 400 | 85 | 3.15 | 2.04 |
| Fly Ash-Class F | 70 | 15 | 2.33 | 0.48 |
| Sand | 1581 | 50 | 2.62 | 9.67 |
| 1" × #4 | 1247 | 39 | 2.65 | 7.54 |
| ⅜" × #8 | 352 | 11 | 2.65 | 2.13 |
| Water | 36.0 gal. 299.9 | | | 4.81 |
| Entrapped Air | 1.25% | | | 0.34 |
| | Wt. = 3950 | | Vol. = | 27.00 |
| ADMIXTURES: | | | | |
| FiberFlo ™ | 3.0 Gal. | 1.0 lb. Fiber | | |

As can be seen, a mixture of ash, sand, and cement, without additives, was formed. The cement was cured and then tested.

Listed below are the results of tests conducted on the cured cement product:

| Field Test Results | | Compressive Strength Results | | | |
|---|---|---|---|---|---|
| Slump: | 5" | ASTM C143 | 28 day | 120020 | 4245 |
| Concrete Temp: | 79° F. | ASTM C231 | 28 day | 129910 | 4595 |
| Air Temp: | 90° F. | ASTM C138 | 28 day | 124965 | 4420 |
| Time: | 15:05 | ASTM C1064 | avg. | | |
| Time Set: | 20:50 | | | | |

As can be seen, when compared to the cement of Example 1, the present cement had better compressive strength. Importantly, the cement was observed not to crack.

Example 3

A cement mixture was prepared for use in comparing a cured cement product with a cement product having fibers added thereto.

The below list describes the starting materials, equipment, and characteristics:

| Mix I.D. No. 3 | | | |
|---|---|---|---|
| Project: | | | |
| Contractor: | | | |
| Description: | 2000 psi Pump Mix | W/C ratio: | 0.68 |
| Strength (fc): | 2000 psi | Sack Content: | 5.50 sk. |
| Slump: | 4 inch | Gal/sk.: | 7.64 |
| Max. Size of Agg.: | ⅜ inch | Un. Wt.: | 143.2 |

As can be seen, the process started with 5.50 sacks or 517 pounds of cementicious material mixed with 7.64 gallons of water per sack or 42.02 gallons of water. All procedures outlined in ASTM C31 were used to place the cement in molds. This was a standard mix, regardless of whether fibers were added.

A cement composition was formed and poured into a mold. The following list describes the constituents added to the mixture used to form the cement:

| Contents | | Batch Wt. | % Used | Sp. Gr. | | Volume |
|---|---|---|---|---|---|---|
| Cement | | 439 | 85 | 3.15 | | 2.23 |
| Fly Ash-Class F | | 78 | 15 | 2.33 | | 0.54 |
| Sand | | 2093 | 70 | 2.62 | | 12.80 |
| ⅜" × #8 | | 907 | 30 | 2.65 | | 5.49 |
| Water | 42.0 gal. | 349.9 | | | | 5.61 |
| Entrapped Air | 1.25% | | | | | 0.34 |
| | Wt. = | 3867 | | | Vol. = | 27.00 |
| ADMIXTURES: | | | | | | |
| Water Reducer | | 3.0 cwt. | 15.5 oz. | | | |

As can be seen, a mixture of ash, sand, and cement, without additives, was formed. The cement was cured and then tested.

Listed below are the results of tests conducted on the cured cement product:

| Field Test Results | | Compressive Strength Results | | | |
|---|---|---|---|---|---|
| Slump: | 5" | ASTM C143 | 28 day | 95340 | 3372 |
| Concrete Temp: | 75° F. | ASTM C231 | 28 day | 94270 | 3335 |
| Air Temp: | 84° F. | ASTM C138 | 28 day | 94805 | 3354 |
| Time: | 13:40 pm | ASTM C1064 | avg. | | |
| Time Set: | 19:10 pm | | | | |

As can be seen, when compared to the cement of Example 1, the present cement was similar.

Example 4

A cement mixture was prepared for use in comparing a cured cement product with a cement product having fibers added thereto.

The below list describes the starting materials, equipment, and characteristics:

| Mix I.D. No. 4 | | | |
|---|---|---|---|
| Description: | 2000 psi Pump Mix | W/C ratio: | 0.68 |
| Strength (fc): | 2000 psi | Sack Content: | 5.50 sk. |
| Slump: | 4 inch | Gal/sk.: | 7.64 |
| Max. Size of Agg.: | ⅜ inch | Un. Wt. | 143.2 |

As can be seen, the process started with 5.50 sacks or 517 pounds of cementicious material mixed with 7.64 gallons of water per sack or 42.02 gallons of water. All procedures outlined in ASTM C31 were used to place the cement in molds. This was a standard mix, regardless of whether fibers were added.

A cement composition was formed and poured into a mold. Each mold was 6" by 12" and filled according to the procedures outlined in ASTM C31. The following list describes the constituents added to the mixture used to form the cement:

| Contents | | Batch Wt. | % Used | Sp. Gr. | | Volume |
|---|---|---|---|---|---|---|
| Cement | | 439 | 85 | 3.15 | | 2.23 |
| Fly Ash-Class F | | 78 | 15 | 2.33 | | 0.54 |
| Sand | | 2093 | 70 | 2.62 | | 12.80 |
| ⅜" × #8 | | 907 | 30 | 2.65 | | 5.49 |
| Water | 42.0 gal. | 349.9 | | | | 5.61 |
| Entrapped Air | 1.25% | | | | | 0.34 |
| | Wt. = | 3867 | | | Vol. = | 27.00 |
| ADMIXTURES: | | | | | | |
| Water Reducer | | 3.0 cwt. | 15.5 oz. | | | |
| FiberFlo ™ | | 0.833 gal | 1.00 lb. | | | |

As can be seen, a mixture of ash, sand, and cement, without additives, was formed. The cement was cured and then tested.

Listed below are the results of tests conducted on the cured cement product:

| Field Test Results | | | | Compressive Strength Results | |
|---|---|---|---|---|---|
| Slump: | 5" | ASTM C143 | 28 day | 95560 | 3380 |
| Concrete Temp: | 75° F. | ASTM C231 | 28 day | 86360 | 3055 |
| Air Temp: | 84° F. | ASTM C138 | 28 day | 90960 | 3218 |
| Time: | 13:40 pm | ASTM C1064 | avg. | | |
| Time Set: | 19:15 pm | | | | |

As can be seen, when compared to the cement of Example 3, the present cement had similar compressive strength. Importantly, the cement was observed not to crack.

Example 5

To make an exemplary gel, the following was done. Xanthan gum powder and water were mixed with a hand mixer. The xanthan powder was dispersed during this process. The powder was simply added to the water. The final solution had 0.042 pounds of dry xanthan gum added to 1 gallon of water. The solution was mixed for 15–20 minutes. The fiber was added in small amounts during mixing. The process was done under ambient conditions.

Example 6

Another gel solution was prepared as follows:

A 2% xanthan solution was made by mixing 100 lbs. xanthan powder with 150 lbs. "surcide p" (a fungicide) and 4,750 lbs. water. The mixture was mixed at 1200 rpm with a cowles style dispersing blade for 30 minutes until fully dispersed.

The next series of Examples are directed to delivery of gel solutions (discussed above) by pumping to the cement mixture.

Example 7

A gel solution was prepared from 2000 pounds of water, 250 pounds of polypropylene fibers (maximum length 0.75 inch from PGI Fiber Source (Polymer Group Inc.), 701 E. Avenue A, Kingman, Kans. 67068, 20 pounds of dry Xanthan Gum Powder, commercially known as Industrial Grade Xantham from Archer Daniels Midland Corporation, and 60 pounds of liquid fungicide solution, commercially known as Surcide-P, from Surety Laboratories, Inc., 242 Old New Brunswick Rd., #100, Piscataway, N.J. 08854. This gel solution was placed into a standard Storage Vessel. A line was then placed into the storage vessel, this line attached to a peristaltic/hose pump, detailed below.

Delivery of this gel solution was found to be successful with four pumps, as follows.

An ASH/32 pump from Allweiler, AG, Radolfzell, Germany having a 32 millimeter (mm) inner hose diameter, pumped the gel solution at speeds ranging from 6 gallons per minute to 11.5 gallons per minute, with 11.5 gallons per minute being preferred.

An ASH/40 pump from Allweiler, AG, Radolfzell, Germany having a 40 mm inner hose diameter, pumped the gel solution at a speed of 20 gallons per minute.

An Bredel SP/25 high-pressure hose pump from Watson-Marlow, Inc. 37 Upton Technology Park, Wilmington, Mass. 01887-1018, having a 25 mm inner hose diameter, pumped the gel solution at speeds ranging from 3 gallons per minute to 7 gallons per minute, with 7 gallons per minute being preferred.

An Bredel SP/40 high-pressure hose pump from Watson-Marlow, Inc. 37 Upton Technology Park, Wilmington, Mass. 01887-1018, having a 40 mm inner hose diameter, pumped the gel solution at a speed of 20 gallons per minute.

Example 8

A gel solution was prepared from 2000 pounds of water, 250 pounds of polypropylene fibers (maximum length 0.75 inch from PGI Fiber Source (Polymer Group Inc.), 701 E. Avenue A, Kingman, Kans. 67068, 30 pounds of dry Xanthan Gum Powder, commercially known as Industrial Grade Xantham from Archer Daniels Midland Corporation, and 60 pounds of liquid fungicide solution, commercially known as Surcide-P, from Surety Laboratories, Inc., 242 Old New Brunswick Rd., #100, Piscataway, N.J. 08854. This gel solution was placed into a standard Storage Vessel. A line was then placed into the storage vessel, this line attached to a peristaltic/hose pump, as described in Example 7 above.

Delivery of this gel solution was found to be successful with these four pumps (of Example 7 above).

Example 9

A gel solution was prepared from 2000 pounds of water, 250 pounds of polypropylene fibers (maximum length 0.75 inch from PGI Fiber Source (Polymer Group Inc.), 701 E. Avenue A, Kingman, Kans. 67068, 40 pounds of dry Xanthan Gum Powder, commercially known as Industrial Grade Xantham from Archer Daniels Midland Corporation, and 60 pounds of liquid fungicide solution, commercially known as Surcide-P, from Surety Laboratories, Inc., 242 Old New Brunswick Rd., #100, Piscataway, N.J. 08854. This gel solution was placed into a standard Storage Vessel. A line was then placed into the storage vessel, this line attached to a peristaltic/hose pump, as described in Example 7 above.

Delivery of this gel solution was found to be successful with these four pumps (of Example 7 above).

Example 10

A gel solution was prepared from 2000 pounds of water, 175 pounds of polypropylene fibers (maximum length 0.75 inch from PGI Fiber Source (Polymer Group Inc.), 701 E. Avenue A, Kingman, Kans. 67068, 20 pounds of dry Xanthan Gum Powder, commercially known as Industrial Grade Xantham from Archer Daniels Midland Corporation, and 60 pounds of liquid fungicide solution, commercially known as Surcide-P, from Surety Laboratories, Inc., 242 Old New Brunswick Rd., #100, Piscataway, N.J. 08854. This gel solution was placed into a standard Storage Vessel. A line was then placed into the storage vessel, this line attached to a peristaltic/hose pump, as described in Example 7 above.

Delivery of this gel solution was found to be successful with these four pumps (of Example 7 above).

Example 11

A gel solution was prepared from 2000 pounds of water, 125 pounds of polypropylene fibers (maximum length 0.75 inch from PGI Fiber Source (Polymer Group Inc.), 701 E. Avenue A, Kingman, Kans. 67068, 20 pounds of dry Xanthan Gum Powder, commercially known as Industrial Grade Xantham from Archer Daniels Midland Corporation, and 60 pounds of liquid fungicide solution, commercially known as Surcide-P, from Surety Laboratories, Inc., 242 Old New Brunswick Rd., #100, Piscataway, N.J. 08854. This gel solution was placed into a standard Storage Vessel. A line was then placed into the storage vessel, this line attached to a peristaltic/hose pump, as described in Example 7 above.

Delivery of this gel solution was found to be successful with these four pumps (of Example 7 above).

Example 12

A gel solution was prepared from 2000 pounds of water, 70 pounds of polypropylene fibers (maximum length 0.75 inch from PGI Fiber Source (Polymer Group Inc.), 701 E. Avenue A, Kingman, Kans. 67068, 20 pounds of dry Xanthan Gum Powder, commercially known as Industrial Grade Xantham from Archer Daniels Midland Corporation, and 60 pounds of liquid fungicide solution, commercially known as Surcide-P, from Surety Laboratories, Inc., 242 Old New Brunswick Rd., #100, Piscataway, N.J. 08854. This gel solution was placed into a standard Storage Vessel. A line was then placed into the storage vessel, this line attached to a peristaltic/hose pump, as described in Example 7 above.

Delivery of this gel solution was found to be successful with these four pumps (of Example 7 above).

Thus, there has been shown and described a fiber gel mixture for use in concrete which fulfills all the objects and advantages sought therefor. The invention illustratively disclosed herein suitably may be practiced in the absence of any element which is not specifically disclosed herein. It is apparent to those skilled in the art, however, that many changes, variations, modifications, and other uses and applications to the fiber gel mixture are possible, and also such changes, variations, modifications, and other uses and applications which do not depart from the spirit and scope of the invention are deemed to be covered by the invention, which is limited only by the claims which follow.

What is claimed is:

1. A method for adding fibers to cement comprising:
providing a gel composition from fibers and a thickened aqueous composition;
delivering the gel composition through a gravity-fed storage container to a self-metering pump, by creating a positive head pressure on the gel composition; and
delivering the gel composition through the self-metering pump to a cement composition.

2. The method of claim 1, wherein the gel composition is delivered from the gravity-fed storage container through a hose to the self-metering pump.

3. The method of claim 1, wherein the self-metering pump includes a peristaltic pump.

4. The method of claim 2, wherein the hose is of a length and diameter that will allow delivery of the gel composition from the gravity-fed storage container to the self-metering pump and will not cause the gel composition to clog.

5. The method of claim 2, wherein the hose is of a length equal to or less than 10 feet.

6. The method of claim 3, wherein the gel composition is delivered through peristaltic pump at a constant rate.

7. The method of claim 3, wherein the gel composition is delivered through the peristaltic pump at a variable rate.

8. The method of claim 3, wherein the delivering the gel composition through the peristaltic pump includes delivering the gel composition from the peristaltic pump trough an approximately 25 millimeter line.

9. The method of claim 3, wherein the delivering the gel composition through the peristaltic pump includes delivering the gel composition from the peristaltic pump through an approximately 32 millimeter line.

10. The method of claim 3, wherein the delivering the gel composition through the peristaltic pump includes delivering the gel composition from the peristaltic pump through an approximately 40 millimeter line.

11. The method of claim 2, wherein the gravity-fed storage container is configured with at least one opening for loading, and at least one discharge opening.

12. The method of claim 11, wherein the gravity-fed storage container is configured in a cylindrical form.

13. The method of claim 11, wherein the at least one discharge opening is configured in a conical form to define a conical discharge opening.

14. The method of claim 13, wherein said the at least one gravity-fed storage container is configured with a bottom surface that slopes toward the at least one conical discharge opening.

15. The method of claim 13, wherein the at least one conical discharge opening is offset from the center of the gravity-fed storage container with an angle of 60° from the floor.

16. The method of claim 11, wherein the positive head pressure exerts positive head pressure on the gel composition at the discharge opening of the gravity-fed storage container.

17. The method of claim 16, wherein the positive head pressure is exerted on the gel composition throughout the hose.

18. A method for automating dispersal of fibers in concrete, comprising:
providing a gel containing fibers in a container;
creating a positive head pressure on the gel in the container; and
using a computer controlled metering pump to deliver the gel into uncured cement.

19. The method of claim 18, wherein the computer controlled metering pump includes a peristaltic pump.

20. A method for adding fibers to cement comprising:
providing a gel composition from fibers and a thickened aqueous composition; and,
delivering the gel composition from a storage container configured in a cylindrical form with at least one conical discharge opening for loading, and a bottom surface that slopes toward the at least one conical discharge opening, including;
creating a positive head pressure on the gel composition in the storage container and causing the gel composition to flow through a hose with a length equal to or less than 10 feet; and,
causing the gel composition to flow through a peristaltic pump to a cement composition.

21. The method of claim 20, wherein the gel composition is delivered through the peristaltic pump at a constant rate.

22. The method of claim 20, wherein the gel composition is delivered through the peristaltic pump at a variable rate.

23. The method of claim 20, wherein the delivering the gel composition through the peristaltic pump includes delivering the gel composition from the peristaltic pump through an approximately 25mm line.

24. The method of claim 20, wherein the delivering the gel composition through the peristaltic pump includes delivering the gel composition from the peristaltic pump through an approximately 32mm line.

25. The method of claim 20, wherein the delivering the gel composition through the peristaltic pump includes delivering the gel composition from the peristaltic pump through an approximately 40mm line.

26. The method of claim 20, wherein the storage container is configured with the at least one conical discharge opening offset from the center of the storage container with an angle of 60° from the floor.

27. The method of claim 20, wherein the creating positive head pressure includes producing positive head pressure on the gel composition at the discharge opening of the storage container.

* * * * *